United States Patent

Smith

[11] Patent Number: 5,979,499
[45] Date of Patent: Nov. 9, 1999

[54] UNDERSEA HYDRAULIC COUPLING WITH HOLLOW METAL SEAL

[75] Inventor: Robert E. Smith, Stafford, Tex.

[73] Assignee: National Coupling Company, Inc., Stafford, Tex.

[21] Appl. No.: 08/732,534

[22] Filed: Oct. 15, 1996

Related U.S. Application Data

[63] Continuation of application No. 08/420,427, Apr. 12, 1995, abandoned.

[51] Int. Cl.$^6$ ........................................... F16L 29/00
[52] U.S. Cl. ....................................... 137/614.04; 285/108
[58] Field of Search ........................ 137/614.04; 285/97, 285/108, 917

[56] References Cited

U.S. PATENT DOCUMENTS

| | | |
|---|---|---|
| 1,814,479 | 7/1931 | Metcalf . |
| 1,913,982 | 6/1933 | Fox . |
| 2,129,704 | 11/1938 | Meyer . |
| 2,635,931 | 4/1953 | May . |
| 2,647,770 | 8/1953 | Tollefsbol . |
| 2,862,775 | 12/1958 | Kupiec . |
| 3,046,026 | 7/1962 | Burrows . |
| 3,058,750 | 10/1962 | Taylor . |
| 3,116,944 | 1/1964 | Parker . |
| 3,147,015 | 9/1964 | Hanback . |
| 3,163,431 | 12/1964 | Tanner . |
| 3,184,246 | 5/1965 | Kline . |
| 3,279,806 | 10/1966 | Bialkowski . |
| 3,288,472 | 11/1966 | Watkins . |
| 3,291,152 | 12/1966 | Comer . |
| 3,373,998 | 3/1968 | Bialkowski . |
| 3,378,269 | 4/1968 | Castor . |
| 3,519,278 | 7/1970 | Fuhrmann et al. . |
| 3,759,552 | 9/1973 | Levinsohn et al. . |
| 4,302,020 | 11/1981 | Morales . |
| 4,452,462 | 6/1984 | Karr . |
| 4,637,470 | 1/1987 | Weathers . |
| 4,640,455 | 2/1987 | Grein et al. . |
| 4,658,847 | 4/1987 | McCrone . |
| 4,694,859 | 9/1987 | Smith, III . |
| 4,709,726 | 12/1987 | Fitzgibbons . |
| 4,754,780 | 7/1988 | Smith, III . |
| 4,768,538 | 9/1988 | Mintz . |
| 4,770,426 | 9/1988 | Kropatsch . |
| 4,813,454 | 3/1989 | Smith, III . |
| 4,817,668 | 4/1989 | Smith, III . |
| 4,832,080 | 5/1989 | Smith, III . |
| 4,834,139 | 5/1989 | Fitzgibbons . |
| 4,858,648 | 8/1989 | Smith, III . |
| 4,884,584 | 12/1989 | Smith, III . |
| 4,900,071 | 2/1990 | Smith, III . |
| 4,915,397 | 4/1990 | Nicholson . |
| 4,915,419 | 4/1990 | Smith, III . |
| 5,015,016 | 5/1991 | Smith, III . |
| 5,029,613 | 7/1991 | Smith, III . |
| 5,052,439 | 10/1991 | Smith, III . |
| 5,099,882 | 3/1992 | Smith, III . |
| 5,160,175 | 11/1992 | Yang .................................... 285/108 X |
| 5,339,861 | 8/1994 | Smith, III . |

*Primary Examiner*—John Fox
*Attorney, Agent, or Firm*—Arnold White & Durkee

[57] ABSTRACT

An undersea hydraulic coupling having a ring-shaped metal seal that is held in place between the female member body and a sleeve-shaped seal retainer is disclosed. The annular metal seal includes a lip or leg section which is clamped in place between the female member body and the seal retainer. A hollow portion of the seal extends radially inwardly from the lip portion of the seal and is expansible to form a fluid tight seal against the body of the male member. The hollow portion of the metal seal is preferably cylindrical in cross-section and is sufficiently flexible in response to fluid pressure to form a fluid tight seal between the female member, male member, and seal retainer.

16 Claims, 1 Drawing Sheet

UNDERSEA HYDRAULIC COUPLING WITH HOLLOW METAL SEAL

This application is a File Wrapper Continuing Application Ser. No. 08/420,427, filed Apr. 12, 1995, now abandoned.

BACKGROUND OF THE INVENTION

1. Field Of The Invention

This invention relates in general to hydraulic couplings, and specifically to hydraulic couplings used in undersea drilling and production applications. More particularly, this invention involves a hydraulic coupling having a hollow metal seal retained in the female member upon separation of the coupling members.

2. Description of the Related Art

Subsea hydraulic couplings are old in the art. The couplings generally consist of a male member and a female member with sealed passageways connected therebetween. The female member generally is a cylindrical body with a relatively large diameter longitudinal bore at one end and a relatively small diameter longitudinal bore at the other. The small bore facilitates a connection to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in U.S. Pat. No. 4,694,859 to Robert E. Smith III, and other patents owned by National Coupling Company, Inc. of Stafford, Tex.

In undersea drilling and production applications, the male member of the coupling may be connected to a manifold plate or other securement at a subsea location at the inside or outside of the well bore. In many cases, the male members are positioned so that the end or leading face of each member faces up from the sea floor. The female members, which also may be secured to a manifold plate, are moved into position over the male members and then lowered onto the male members by a diver or subsea vehicle. When the female members are positioned on the male members, hydraulic fluid flow typically is from the female member to the male member of each coupling.

The male and female members typically have poppet valves which are spring biased to the closed position. The poppet valve typically includes a conical valve face which seats, in the closed positioned, against a valve seat in the coupling member. The poppet valve opens to allow fluid flow, and closes against the valve seat within the bore to arrest the flow. The valve may includes a valve actuator which may be a nose or stem extending from the apex of the valve face along the longitudinal axis of the poppet valve.

U.S. Pat. No. 4,694,859 shows a hollow metal seal in a coupling of the foregoing type. Fluid pressure in the coupling urges the inner circumference of the seal radially inwardly to seal with the male member. The seal is retained in the female member bore by a seal retainer, which may be a sleeve insertable into the female member bore or threaded to the female member to abut the metal seal.

SUMMARY OF THE INVENTION

The present invention resides in a hydraulic undersea coupling of the foregoing type, including male and female members for fluid communication therebetween, with a hollow metal seal which is retained in the female member upon separation of the coupling members. The hollow metal seal comprises a lip or leg portion that is clamped between the female member and the seal retainer. The seal also includes a hollow portion which is preferably cylindrical in cross-section and includes an opening through which fluid may enter the hollow portion of the seal. Fluid pressure inside the seal urges the seal to flex radially inwardly against the outer circumference of the male member.

DETAILED DESCRIPTION OF A PREFERRED EMBODIMENT

Figure 1:
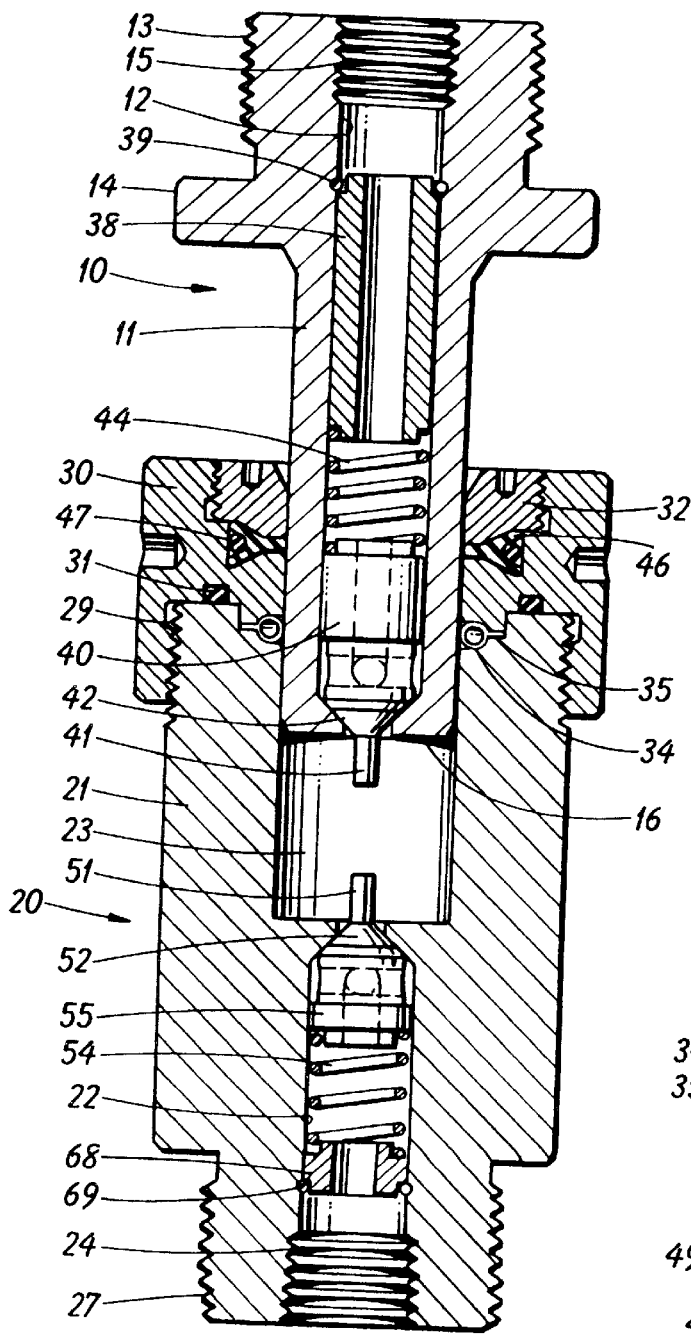
FIG. 1 is a sectional view of the male and female coupling members according to a first embodiment of the present invention, with the male member partially inserted into the female member receiving chamber.

A preferred embodiment of the present invention, as shown in FIG. 1, comprises a male member 10, a female member 20, and fluid passages establishing fluid communication between the male member and female member. When the male member is inserted into the female member receiving chamber 23, fluid communication between the members is established when the actuators of poppet valves 40 and 55 are mutually engaged.

FIG. 1 is a sectional view of the male and female coupling members showing the male member partially inserted into the receiving chamber. As shown in FIG. 1, the male member 10 comprises probe 11 with longitudinal bore 12 extending therethrough and poppet valve 40 slidably received in the bore. The male member also comprises shoulder 14 and handle 13 which optionally is threaded or otherwise connected to a manifold plate. The male member bore 12 includes threaded section 15 for connection to hydraulic lines.

Preferably poppet valve 40 includes a valve face 42 and valve actuator 41 which extends longitudinally from the apex of the valve face. In a preferred embodiment, valve actuator 41 extends outwardly from the leading face 16 of the male member, into receiving chamber 23. The valve face 42 seals against a seat in the male member bore 12 adjacent leading face 16. The poppet valve is urged into the closed position by poppet valve spring 44. The spring 44 is positioned between the poppet valve 40 and spring retainer 38. Spring retainer 38 preferably includes an internal passageway and is anchored in the male member bore 12 by retainer clip 39.

Female member 20 comprises body 21, central bore 22, poppet valve 55, and receiving chamber 23 for slidably receiving the male member probe therein. Poppet valve 55 is substantially similar to the poppet valve 40 of the male member and comprises conical valve face 52, valve actuator 51 extending therefrom, valve spring 54 urging the poppet valve 55 into the closed position, retainer 68 and retainer clip 69. When valve actuator 41 of the male member poppet valve contacts valve actuator 51 of the female member, the mutually engaged poppet valves open to allow fluid passage between the male and female coupling members. At one end of the female member body is a threaded handle 27 for connection to manifold plates and the like. The female member bore 22 also is provided with a threaded section 24 for connection to hydraulic lines.

Figure 2:
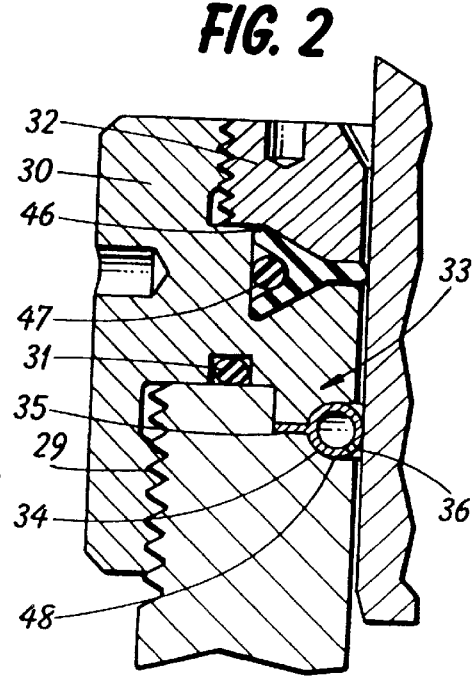
FIG. 2 is an expanded sectional view of the seal and retainer structure in the embodiment of FIG. 1.
Figure 3:
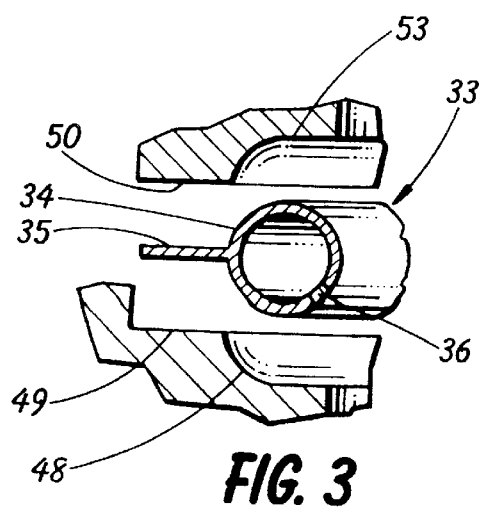
FIG. 3 is an expanded sectional view of the seal used in FIG. 1.

In a preferred embodiment, the receiving chamber adjacent the first end of the female member body has a circumferential shoulder 49 on which the lip or leg section 35 of annular ring-shaped metal seal 33 is positioned. The lip or leg section 35 is clamped between circumferential shoulder surface 49 of the female member and shoulder surface 50 of seal retainer 30. Seal retainer 30 is a sleeve-shaped member tightenable to clamp the leg section 35 in place. In a preferred embodiment the seal retainer 30 is threaded to threaded section 29 at the first end of the female member body. Integral with the leg section of the annular metal seal 33 and extending radially inwardly therefrom is hollow portion 34. In a preferred embodiment, as shown in FIG. 3, the hollow portion 34 is cylindrical in cross-section. The hollow portion may be enclosed, or may include passage 36 between the inside and outside of the hollow portion. In the embodiment of FIGS. 1–3, fluid pressure in the coupling enters the hollow portion 34 of the metal seal through passage 36. Metal seal 33 is formed of metal that is sufficiently flexible to allow fluid pressure inside the hollow portion 34 of the seal to cause the seal to expand in response thereto. Preferably, the hollow portion of the seal expands radially inwardly in response to fluid pressure to sealingly engage the probe 11 of the male member. Although it is preferable that the hollow portion 34 of the metal seal be cylindrical or generally cylindrical in cross-section, other arcuate shapes may be used such as an oval or a segment of a cylinder. If the hollow portion is a segment of a cylinder, that portion of the seal when exposed to fluid pressure should similarity be urged radially inwardly against the probe 11 of the male member.

In a preferred embodiment, as shown in FIGS. 1–3, shoulder surface 48 is provided at the end of the female member and is dimensioned to hold the hollow portion 34 of seal 33. Similarily, shoulder surface 53 is provided in the seal retainer 30 to accommodate the hollow portion of the seal. In a preferred embodiment, when the retainer is tightened against the female member, shoulder surface 53 and shoulder surface 48 axially compress the hollow portion 34 of the metal seal to urge the metal seal radially inwardly and "preload" the metal seal prior to fluid energization. However, the seal may also be used without any axial compression. For example, even without axial compression, the seal may extend radially into the receiving chamber to engage the male member probe 11 when it is inserted through the seal retainer 30 and into the receiving chamber 23. If the hollow portion of the seal is axially compressed, it also may have a slight interference with the male member probe 11. If, as shown in FIGS. 1–3, the hollow portion of the seal has a passage for fluid pressure to enter, it expands against the male member, and against shoulders 53 and 48 to effect a fluid tight seal against those surfaces. Thus, the hollow portion of the seal forms a seal with the male member, female member, and seal retainer.

As shown in FIGS. 1 and 2, the seal retainer 30 is a sleeve shaped body that is threaded to the first end of the female member body 21. Other attachment means may be used to engage the retainer with the female member body, and clamp the leg or lip portion 35 of metal seal 33 therebetween. In a preferred embodiment, seal 31 is an elastomeric O-ring, which provides a backup seal between the seal retainer 30 and the first end of the female member. Also shown in FIGS. 1 and 2 is seal 36 which may be used in a preferred embodiment between two-piece retainer 30,32. Seal 36 is preferably an elastomeric dove-tail shape seal that is held in place between the first 30 and second 32 components of the seal retainer. This provides a backup seal between the seal retainer and the male member. In the embodiment of FIG. 2, O-ring seal 47 is used in conjunction with dove-tail seal 46. Preferably, dove-tail seal 46 and O-ring seal 47 are elastomeric seal members providing a radial seal with the outer circumference of the male member when it is inserted through the seal retainer prior to engagement of the male member with annular metal seal 33.

Although variations of the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling comprising:
   (a) a male member having an outer cylindrical surface, an internal bore and a valve for controlling fluid flow through the bore;
   (b) a female member having an internal bore, a valve for controlling fluid flow through the bore, and a receiving chamber dimensioned to receive the male member therein, the receiving chamber having a circumferential shoulder;
   (c) an annular metal seal having a lip portion positioned on the circumferential shoulder and a hollow portion disposed radially inwardly from said lip portion, the hollow portion of the annular seal flexible for sealing with the outer cylindrical surface of the male member when the male member is inserted into the receiving chamber and through the annular seal; and
   (d) a seal retaining member having a shoulder surface tightenable against the circumferential shoulder in the receiving chamber and clamping the lip portion between the shoulder surface of the seal retaining member and the circumferential shoulder in the receiving chamber to eliminate any gap between the shoulder surface and the seal retaining member, lip portion and shoulder.

2. The undersea hydraulic coupling of claim 1 wherein the hollow portion of the seal has a passage therethrough for fluid to enter the hollow portion.

3. The undersea hydraulic coupling of claim 1 wherein the hollow portion of the annular metal seal is generally cylindrical in cross-section.

4. The undersea hydraulic coupling of claim 1 wherein the seal retaining member is threaded to the female member.

5. The undersea hydraulic coupling of claim 1 wherein the seal retaining member includes an elastomeric seal adapted to seal with the male member.

6. An undersea hydraulic coupling comprising:
   (a) a female member having a longitudinal bore extending from a first end to a second end thereof and a circumferential shoulder in the bore;
   (b) a sleeve member having a shoulder tightened against the circumferential shoulder in the bore of the female member;
   (c) a male member having an outer circumference slidably inserted through the sleeve member and into the longitudinal bore of the female member; and
   (d) a flexible ring-shaped metal seal having a first section and a second section, the first section clamped between the shoulder of the sleeve member and the circumferential shoulder in the bore to remove any gap between the shoulder of the sleeve member and the first end of the female member;

and the second section extending radially inwardly from the first section and having an arcuate outer surface engaged with the outer circumference of the male member.

7. The undersea hydraulic coupling of claim 6 wherein the seal has an inner surface exposed to fluid pressure in the longitudinal bore of the female member whereby the fluid pressure urges the second section radially inwardly.

8. The undersea hydraulic coupling of claim 6 wherein the second section of the ring-shaped metal seal is generally cylindrical in cross-section, with an opening therein.

9. The undersea hydraulic coupling of claim 6 wherein the male and female members include valves to control fluid flow through the coupling, the valves having mutually engageable valve actuators to open the valves upon insertion of the male member into the longitudinal bore of the female member.

10. The undersea hydraulic coupling of claim 6 wherein the sleeve member is threaded to the female member.

11. The undersea hydraulic coupling of claim 6 wherein the sleeve member comprises an outer sleeve and an inner sleeve, and an elastomeric seal therebetween.

12. A female member of a hydraulic coupling, comprising:

(a) a body having a longitudinal axis with first and second ends, a longitudinal bore along the axis, a receiving chamber adjacent the first end, a circumferential shoulder adjacent the first end of the receiving chamber and a valve in the bore movable between an open position and a closed position, the valve biased to the closed position adjacent the second end, the valve having a valve actuator to urge the valve open;

(b) a seal retaining member having a shoulder tightenable against the circumferential shoulder; and (c) a flexible ring-shaped metal seal with a leg section clamped between the shoulder of the seal retaining member and the circumferential shoulder to close any gap between the shoulder of the seal retaining member, leg section and the first end of the body, and a hollow section extending radially inwardly from the leg section and being at least partially cylindrical in cross-section.

13. The female hydraulic coupling member of claim 12 wherein the hollow section has a passage therethrough whereby the hollow section expands responsive to fluid pressure in the longitudinal bore entering the hollow section.

14. The female hydraulic coupling member of claim 12 wherein the seal retaining member is tightened to the body.

15. The female hydraulic coupling member of claim 12 wherein the valve actuator extends longitudinally along the axis into the receiving chamber.

16. The female hydraulic coupling member of claim 12 wherein at least a portion of the hollow section of the seal extends radially into the receiving chamber.

* * * * *